No. 649,888. Patented May 15, 1900.
J. COOK.
MOLD FOR CROCKERY.
(Application filed Feb. 16, 1900.)

(No Model.)

Witnesses:

Inventor:
Joseph Cook,
By Humphrey & Humphrey,
Attorneys.

UNITED STATES PATENT OFFICE.

JOSEPH COOK, OF AKRON, OHIO, ASSIGNOR OF ONE-FOURTH TO CHARLES W. WICKLINE, OF SAME PLACE.

MOLD FOR CROCKERY.

SPECIFICATION forming part of Letters Patent No. 649,888, dated May 15, 1900.

Application filed February 16, 1900. Serial No. 5,455. (No model.)

*To all whom it may concern:*

Be it known that I, JOSEPH COOK, a citizen of the United States, residing at Akron, in the county of Summit and State of Ohio, have invented a certain new and useful Improvement in Molds for Crockery, of which the following is a specification.

My invention has a general relation to improvements in molds for forming vessels of crockery; and it has especial relation to improvements in molds for forming vessels, particularly washbowls, that have what is known as a "roll-rim"—that is, where the rim turns downward at the edge. Heretofore such vessels have been made inverted of the desired plastic material on a mold that forms the inside of the vessel, the outside being formed by rubbing or other means, leaving the green vessel on the mold. Difficulty is experienced in removing the vessel from the mold, which results in breaking, cracking, or springing a large percentage of the ware and consequent loss either before or in the process of burning. One object of my invention is to overcome this difficulty by so constructing the mold that the perfected vessel will be readily separated from it without danger of breaking or distortion and practically automatically, and another object is to form any desired configuration of raised figures on the exterior, and a final object is to sustain the center of the vessel until by drying it shall be sufficiently rigid to be self-supporting.

To the aforesaid objects my invention consists in the peculiar and novel construction, arrangement and combination of parts hereinafter described, and then specifically pointed out in the claims, reference being had to the accompanying drawings, forming a part of this specification.

Figure 1:
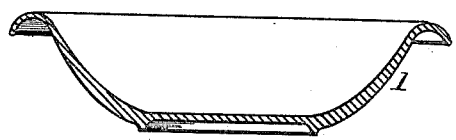
Figure 2:
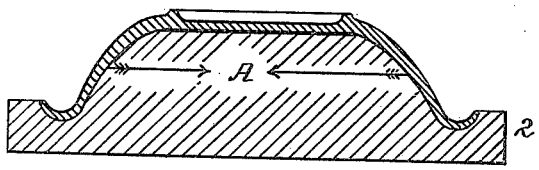
Figure 3:
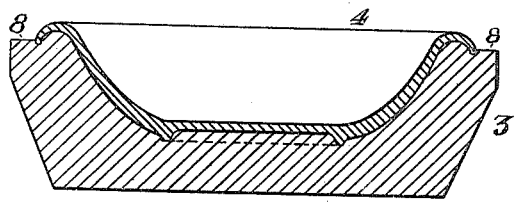
Figure 4:
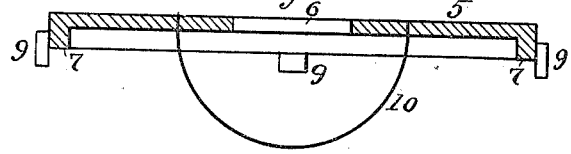

In the accompanying drawings, in which similar reference-numerals indicate like parts in the different views, Figure 1 is a central section of a washbowl having a roll-rim to illustrate my invention. Fig. 2 is a section of the old or common form of mold to assist in explaining the defect to be overcome; Fig. 3, a section of my improved mold with a bowl resting therein; Fig. 4, a section of the receiving-board, and Fig. 5 a section of the mold and board to illustrate their joint operation on the vessel therein.

Figure 5:
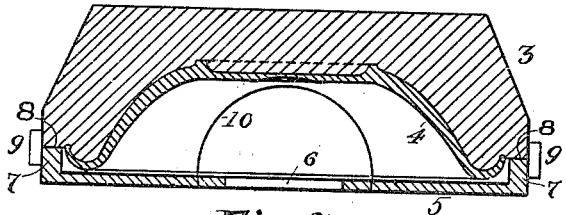

Referring to the drawings, 1 is the section of a washbowl having a roll-rim. As has heretofore been stated, these have been formed in a mold 2, that forms the interior, the finish of the outside being completed by rubbing the clay onto the mold. In drying the contraction of the clay draws in the direction of the arrows, Fig. 2, toward the letter A, thus binding it on the mold, rendering it difficult to remove it without injury. My improved mold 3 is to form the outside of the vessel, and hence can have configuration to form embossed ornamentation on the ware. The plastic material is rubbed into this to form the vessel 4. When this is done, I place on this mold a cover 5, having a central orifice 6 to permit the circulation of air in drying. This cover has an annular rim 7, that rests on the ledge 8 of the mold and is of such depth as will separate the cover about one-eighth of an inch from the top of the roll-rim of the bowl, and a number of guide-cleats 9, that fit about the parts to accurately locate one above the other. When the vessel is of large diameter, I fix on the cover 5 a spring 10, that rises under the center of the vessel and is separated from it the same distance as is the cover from the mold. The cover and mold are then inverted, as shown in Fig. 5, and laid aside to dry. As soon as the vessel shrinks in drying sufficiently to part from the mold it falls onto the cover 5, the distance of the fall being so slight that it is not damaged thereby.

When the mold is inverted, as just stated, any tendency of the central part of the vessel to sag or sink is arrested by the spring 10. As soon as the vessel has dropped onto the cover the mold is removed and the cover and vessel set aside for the latter to dry until fit for burning.

By this invention I prevent all warping and cracking and the molds are relieved and ready for a new vessel in a much shorter time than by the old process hereinbefore referred to, thus greatly increasing the product from a given number of molds.

I claim as my invention—

1. An improved crockery-mold, consisting of a matrix to form the outside of the vessel, in combination with a cover having guides to cause it to register with the mold, and devices for suspending it a short distance from contact with the vessel in the mold, substantially as shown and described.

2. An improved crockery-mold, consisting of a matrix to form the outside of the vessel, in combination with a perforated cover having guides to cause it to register with the mold and devices for suspending it a short distance from contact with the vessel in the mold, substantially as described.

3. An improved crockery-mold, consisting of a matrix, to form the outside of the vessel, in combination with a cover having guides to cause it to register with the mold, devices for suspending it a short distance from the vessel in the mold and a support to arrest the separate descent of the central part of the vessel, substantially as shown and described.

In testimony that I claim the above I hereunto set my hand in the presence of two subscribing witnesses.

JOSEPH COOK.

In presence of—
C. P. HUMPHREY,
C. E. HUMPHREY.